United States Patent [19]
Smolko et al.
[11] 3,895,272
[45] July 15, 1975

[54] THIN-FILM MICROCIRCUIT

[76] Inventors: Gennady Grigorievich Smolko, K-482, Korpus 501, kv. 19, Moscow; Nodari Mikhailovich Chikovani, ulitsa Krylova 10, Tbilisi, both of U.S.S.R.

[22] Filed: Dec. 20, 1973

[21] Appl. No.: 426,464

[30] Foreign Application Priority Data

Dec. 20, 1972 U.S.S.R. .............................. 1855795

[52] U.S. Cl. ........ 317/256; 174/DIG. 5; 317/101 A; 317/243; 323/78; 338/334

[51] Int. Cl. ................................................ H01g 1/08

[58] Field of Search ....... 174/DIG. 5; 317/243, 256, 317/101 A, 101 C; 323/78; 338/308, 320, 334

[56] References Cited

UNITED STATES PATENTS

| | | | |
|---|---|---|---|
| 2,179,566 | 11/1939 | Stoekle | 338/308 X |
| 2,566,666 | 9/1951 | Khouri | 317/256 |
| 3,187,226 | 6/1965 | Kates | 174/DIG. 5 |
| 3,353,124 | 11/1967 | Dilger | 338/308 X |

*Primary Examiner*—E. A. Goldberg
*Attorney, Agent, or Firm*—Holman & Stern

[57] ABSTRACT

A thin-film microcircuit on a metal substrate with an oxide film on which resistors, capacitors and their interconnections are formed, the metal substrate serving as an electrode for the capacitors, and simultaneously, as the ground as well as a heat sink.

1 Claim, 2 Drawing Figures

THIN-FILM MICROCIRCUIT

The invention relates to microelectronics, more particularly to thin-film microcircuit.

Thin-film microcircuits are presently known which are a metal substrate, at least on the surface, which is used to form an anode oxide film having resistors and interconnections made therein.

In the existing microcircuits, the said metal substrate is aluminium and the oxide film is a thin insulating layer of aluminium oxide from 2–3 microns thick.

Other existing microcircuits use a substrate made from an insulating material such as for example: sital (crystalline silicone), ceramic and plastic.

A disadvantage the of thin-film microcircuits using sital is that these circuits are not stable enough to shocks and vibration and have poor heat conductivity.

Microcircuits using ceramics are disadvantageous in that they have a poor surface finish and a low heat conductivity.

A disadvantage of the existing thin-film microcircuits using aluminium with a thin oxide film formed by existing methods on a surface exhibiting low quality finishing is that said oxide film cannot be used as a dielectric for the capacitors as it has a cellular structure, is hygroscopic, and is liable to cracking. Besides a metal surface exhibiting peaks higher than 250 A does not allow for the formation of an oxide film which would make it possible to obtain the uniform metal layers required for making capacitors.

Another disadvantage of the existing thin-film microcircuits using aluminium is that they are not effective enough with regard to parts density and functional capabilities, as the metal substrate is used only as a heat sink.

The object of the present invention is to provide a thin film microcircuit exhibiting high parts density per unit area.

Another object of the invention is to provide a shock - and vibration-resistant microcircuit.

Still another object of the invention is to provide a thin-film microcircuit using a substrate which allows for the formation of an oxide film having a high dielectric constant, an adequate density, and optimum hardness.

With these and other objects in view, a thin-film microcircuit is made on a metal substrate at least one surface of which is used to form an anode oxide film with resistors and their the various interconnections therefor being made therein and, according to the invention, which comprises capacitors disposed in the same layer as the resistors and the interconnections therefor and, which allows for the metal substrate to be used as one of the capacitor electrodes, as a ground and as a heat sink simultaneously, and one in which the surface of the metal substrate on which the film is formed has a mirror finish, and with the thickness of the oxide being chosen such that the film serves as a dielectric for the capacitors.

The thin-film microcircuits of the present invention exhibit successful use as integrated hybrid microcircuits for equipment which has to withstand strong vibrations and high impact loads; involves simple manufacturing techniques; ensures high parts density, and has a high heat dissipation.

The invention will be better understood from the following description of its specific embodiment, when read in connection with the accompanying drawings in which.

Figure 1:
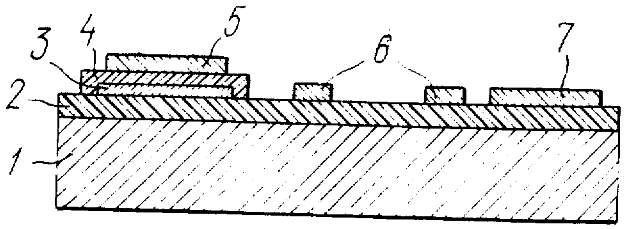
FIG. 1 is a sectional view of a thin-film microcircuit, according to the invention.

The thin-film microcircuit is made on an aluminium substrate 1 (FIG. 1), the thickness thereof being selected within the range of 0.5 to 3 mm. A vacuum-tight anode oxide film having a minimum thickness of 12 micron is formed on one surface of the substrate 1 by deep oxidation so that this film can be used as a dielectric of capacitors. The surface on which said film 2 is grown is first machined to a mirror finish (peaks under 250 A) by existing methods. By using one of the existing methods a passive circuit is made on the oxide film 2, consisting of an existing three-layer capacitor which has a lower electrode 3, a dielectric 4 and an upper electrode 5, resistors 6 and a capacitor which has an aluminium electrode 7, a dielectric in the form of part of the oxide film 2 disposed directly under the electrode 7 and a lower electrode in the form of the metal substrate 1.

Besides, the said substrate simultaneously serves as a heat sink and as ground for the microcircuit.

Figure 2:
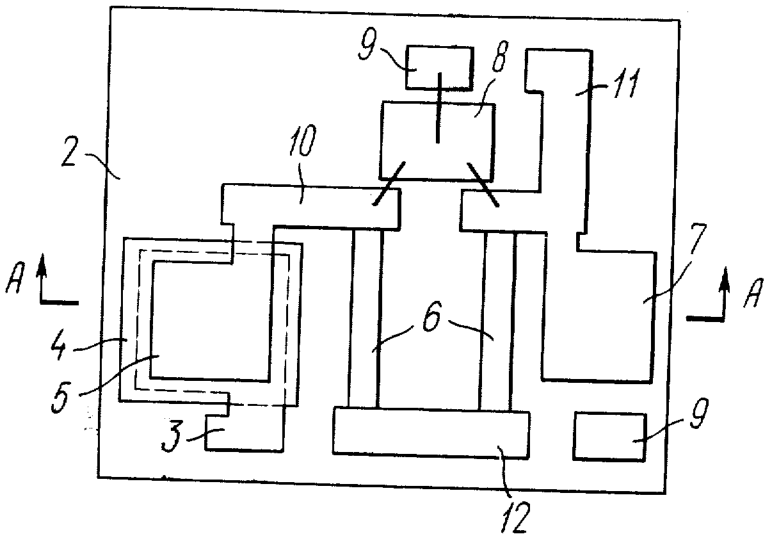
FIG. 2 is a top view of a thin-film microcircuit, according to the invention.

The said microcircuit shown in FIG. 2 forms the basis of an emitter follower wherein the resistors 6 are the base and emitter the loads from a transistor 8. All circuit components are interconnected by means of lands 9 and conductive paths 10, 11 and 12 also made by one of the existing methods simultaneously with the other passive elements (resistors and capacitors).

Said oxide film 2 is obtained by anodic oxidation of aluminium. Prior to oxidation the aluminium substrate 1 is washed and then chemically degreased by any of the existing methods. The electrolyte to be used for oxidation has the following composition:

| | | |
|---|---|---|
| $KTi(C_2O_4)_2$ | 40 – 43 | gr/lit. |
| $C_2H_2O_4 \cdot 2H_2O$ | 1 – 3 | gr/lit. |
| $C_6H_8O_7$ | 1 – 1.3 | gr/lit. |
| $H_3BO_3$ | 8 – 10 | gr/lit. |
| pH | 1.5 – 20 | gr/lit. |

The temperature of the solution is maintained within 55° to 60°. The oxidation is carried out for from 30 – 40 min., with the initial voltage being within 70 to 90 V and the initial current density is from 2 to 3 A/dm². 10 to 15 min before the oxidation ends, the voltage is gradually increased to 120 V and the current density is decreased to from 0.8 – 1 A/dm². The aluminium substrate 1 is a cathode.

The high parts density, the high power dissipation, the vibration and the shock resistance allow the microcircuit described herein to be used in equipment which has to withstand strong vibrations and shocks.

What is claimed is:

1. A thin-film microcircuit comprising: a metal substrate having two surfaces; an anode oxide film formed on at least one of said surfaces; resistor films on said oxide film; and a capacitor provided with two electrodes separated by said oxide film, said film defining a dielectric, with one of said electrodes being formed on said oxide film and being of a surface area substantially less than the surface area of the substrate and the other of said electrodes being defined by said substrate; interconnections between said resistor films and said electrode on said oxide film; said metal substrate being used simultaneously as said other electrode, as ground, and as a heat sink; said surface of said metal substrate with said oxide film having a mirror finish; and said oxide film having a sufficient thickness that said film serves as said dielectric.

* * * * *